(12) United States Patent
Mitterreiter

(10) Patent No.: US 8,547,543 B2
(45) Date of Patent: Oct. 1, 2013

(54) ANGLE-MEASURING DEVICE

(75) Inventor: Johann Mitterreiter, Chieming (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 11 days.

(21) Appl. No.: 13/357,751

(22) Filed: Jan. 25, 2012

(65) Prior Publication Data

US 2012/0188534 A1    Jul. 26, 2012

(30) Foreign Application Priority Data

Jan. 25, 2011   (DE) .......................... 10 2011 003 091

(51) Int. Cl.
*G01B 11/26*        (2006.01)

(52) U.S. Cl.
USPC ...................................... 356/138; 356/139.05

(58) Field of Classification Search
USPC ........................... 356/138–155, 614–615, 622
See application file for complete search history.

(56) References Cited

U.S. PATENT DOCUMENTS 7,359,047 B2 * 4/2008 Lippuner ................... 356/243.1

FOREIGN PATENT DOCUMENTS

DE        102 15 997        10/2002

* cited by examiner

*Primary Examiner* — Tri T Ton
(74) *Attorney, Agent, or Firm* — Kenyon & Kenyon LLP

(57) ABSTRACT

An angle-measuring device includes a first group of components and a second group of components that are rotatable relative to each other about an axis. The first group includes a carrier element for enclosing a shaft and on which a graduation disk is secured, a connecting element, and a device for affixing the connecting element relative to the carrier element. The second group includes a sensor element for scanning the graduation disk. The carrier element and the connecting element are arranged such that the connecting element is able to be brought into operative connection with the carrier element so that torque is transmittable with positive locking between the connecting element and the carrier element about the axis. The connecting element is able to be brought into a positive-locking position by axial displacement by the device for affixing the connecting element, and is able to be prestressed radially against the shaft.

12 Claims, 5 Drawing Sheets

B-B

C-C

D-D

ANGLE-MEASURING DEVICE

CROSS-REFERENCE TO RELATED APPLICATIONS

The present application claims priority to Application No. 10 2011 003 091.3, filed in the Federal Republic of Germany on Jan. 25, 2011, which is expressly incorporated herein in its entirety by reference thereto.

FIELD OF THE INVENTION

The present invention relates to an angle-measuring device. For example, the angle-measuring device includes a carrier element and a graduation disk which is secured on it and whose angular position is detectable by a scanning unit having a sensor element.

BACKGROUND INFORMATION

Angle-measuring devices of this type are used to measure rotary motions of a shaft over one or more rotations. The rotary motion is determined either incrementally or absolutely. The output measured value as a function thereof, is a sequence of counting pulses, a counter value or a code word. Angle-measuring devices are used particularly for machine tools or machining centers for measuring rotary motions. The determination of angles of rotation exactly to only a few angular seconds is crucially important, for example, for rotary tables or swivel heads of machine tools, C-axes of turning machines, but also in the case of printing mechanisms of printing machines. Since exceedingly precise measuring results are attainable when using optical measuring principles, angle-measuring devices of this kind are frequently equipped with an optical measuring system. In this context, usually transparent graduation disks are used, on which an angle graduation or angle scaling is applied. In the interest of a precise measuring result, the graduation disks must be secured exactly on the component to be measured.

German Published Patent Application No. 102 15 997 describes a rotary encoder that has a self-centering clamping device, and in which a shaft is accommodated so as to be enclosed by an encoder shaft as carrier element for a graduation disk.

SUMMARY

Example embodiments of the present invention provide an angle-measuring device, which is able to satisfy the highest demands with respect to reliability and precision.

According to example embodiments of the present invention, an angle-measuring device has a first group of components and a second group of components, the groups of components being mounted in a manner allowing rotation relative to each other about an axis, a relative angular position between the groups of components being determinable by the angle-measuring device. The first group of components includes a carrier element for enclosing a shaft, a graduation disk being attached to the carrier element. The first group of components further includes a connecting element, as well as an affixing device to affix the connecting element relative to the carrier element. On the other hand, the second group of components includes a sensor element for scanning the graduation disk. The carrier element as well as the connecting element are implemented so that the connecting element is able to be brought into operative connection with the carrier element in a manner that torque is transmittable with positive locking between the connecting element and the carrier element about the axis, the connecting element being able to be brought into a positive-locking position by axial displacement by the device for affixing the connecting element, and being able to be prestressed radially against the shaft.

In this context, the connecting element is initially pressed axially against the carrier element by the device for affixing the connecting element, the carrier element being secured axially on the shaft, e.g., by a stop device, so that the shiftability of the carrier element relative to the shaft is limited. Due to suitable elasticities, the radial prestress between the connecting element and the shaft is able to be built up in response to further, comparatively slight axial shift.

For example, the graduation disk may be an annular member or a member in ring-segment or circle-segment geometry, which is provided with an angle graduation or angle scaling.

The carrier element may be in the form of a hollow shaft, so that the shaft may be accommodated in an enclosed manner in the hollow cylindrical space of the carrier element.

Thus, an operative connection may be produced between the connecting element and the carrier element, the operative connection generating no relevant prestresses in the carrier element in the radial direction, so that measuring errors in determining the angular position as a result of radial deformation of the carrier element do not occur. In particular, the carrier element, the connecting element and the device for affixing the connecting element are three separate structural elements or components, which may be produced from steel. The connection of the angle-measuring device to the shaft may be a releasable connection, the carrier element, the connecting element and the affixing device, as well as the shaft being separable from each other again. The shaft may likewise be produced from steel.

The connecting element may, for example, have a higher hardness number than the shaft and/or the carrier element, and affixing device may have a higher hardness number than the shaft and/or the carrier element.

To transmit the torque between the connecting element and the carrier element about the axis, the connecting element and the carrier element have driver surfaces contacting each other, whose alignment has an axially parallel direction, or whose respective normal vector has a tangential directional component specific to the axis. The driver surfaces may be formed flat or curved, e.g., as circumferential surfaces of a cylinder.

The radial prestress may be produced by a wedge effect, especially between the device for affixing the connecting element and the connecting element. In addition, the angle-measuring device may be configured such that the device for affixing the connecting element, or the connecting element itself, has a taper for attaining the wedge effect. Alternatively, both the device for affixing the connecting element and the connecting element itself may each have a taper. For example, the tapers may be formed as inclined flat surfaces or as partial segments of a conical surface.

The angle-measuring device may be configured such that the device for affixing the connecting element is in the form of a closed ring. It should be understood that a closed ring means, for example, having a shape that is closed circumferentially over 360°, with an inner opening. Moreover, the device for affixing the connecting element may have an internal thread. In particular, the internal thread may be provided such that the affixing device is able to be screwed onto the shaft according to the principle of a shaft nut.

The angle-measuring device may include an elastic component, which is disposed between the device for affixing the connecting element and the connecting element itself. For example, a plastic component or an elastomer component, made of rubber, for instance, may be used as an elastic component.

Alternatively or additionally, an undular-washer component or a cup-spring component may be used at this location.

The carrier element has a first and a second end specific to its axial extension. Accordingly, the angle-measuring device may be arranged such that the connecting element engages at one axial end of the carrier element, and at the other axial end of the carrier element, a surface is produced which is able to be brought into frictional operative connection with the shaft, i.e., with a shoulder of the shaft.

The angle-measuring device may be configured such that the device for affixing the connecting element is manipulable from the axial direction. In particular, the affixing device may be configured so that it is manipulable by a tool which is able to be introduced from the axial direction. It is possible to dispense with a possibility of accessing the device for affixing the connecting element from the radial direction.

The positive-locking connection between the connecting element and the carrier element may be provided by a clearance fit or a transition fit. In this manner, it may be ensured that no unacceptable stresses are able to be introduced into the carrier element due to the positive-locking connection. Correspondingly, the positive-locking connection produces no deformations of the carrier element whatsoever, which could lead to a reduction in measuring accuracy.

On its side turned toward the axis during proper usage, the connecting element has, for example, a flat surface, so that this flat surface is able to interact with a further flat surface of the shaft.

Furthermore, on its side turned toward the axis during proper usage, the connecting element may have a projection or a groove, which projects or is set back in the radial direction.

A plurality of connecting elements may be distributed over the periphery of the carrier element. It is possible to use only a single device to affix the connecting elements in this type of construction. Advantageously, the connecting elements may be joined to each other, especially along the lines of a loss-prevention device, for example, by a circumferential member, for instance, an annular member or a spring or an open spring wire. The member or annular member may be axially elastic, so that it is elastically deformable in response to manipulation of the device for affixing the connecting element. In this context, the elastic deformation may correspond to a compression of the member or annular member in the axial direction. At the same time, connecting elements in the circumferential direction may be pressed against driver surfaces of the carrier element.

Further features and aspects of example embodiments of the present invention are described in more detail below with reference to the appended Figures.

DETAILED DESCRIPTION

Figure 1:
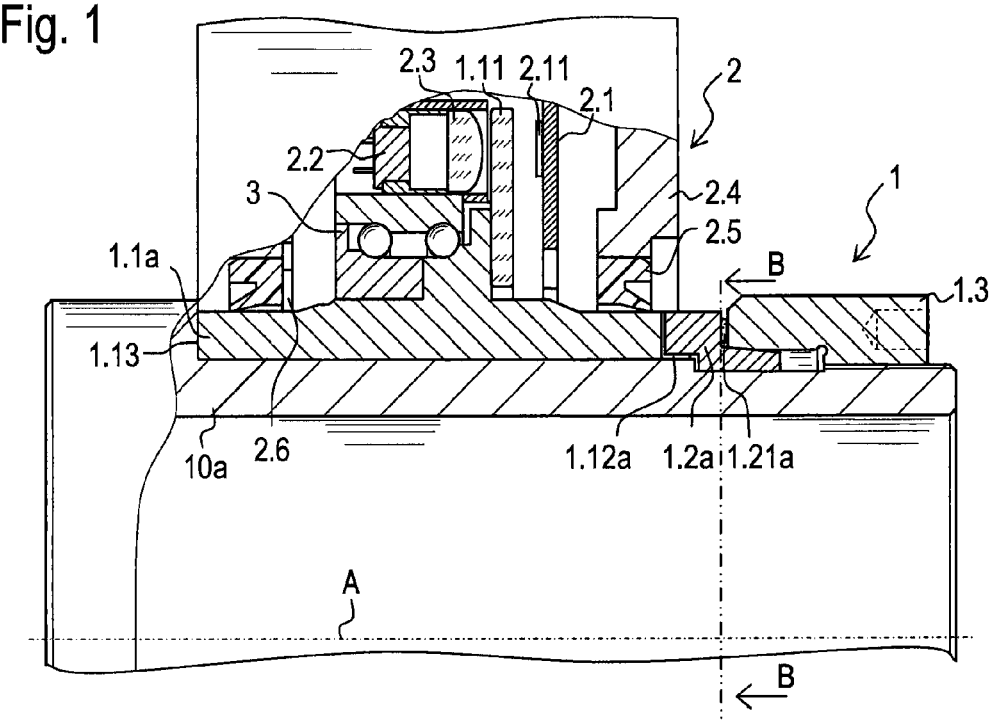
FIG. 1 is a partial cross-sectional view through an angle-measuring device.

Hereinafter, the same reference numerals are used for identical components. FIG. 1 shows a partial longitudinal cross-sectional view through an angle-measuring device. The angle-measuring device includes a first group of components, which may be denoted as rotor 1 in the exemplary embodiment illustrated in FIG. 1. Rotor 1 is rotatable about an axis A relative to a second group of components, the second group of components being in the form of, e.g., a stator 2.

Figure 2:
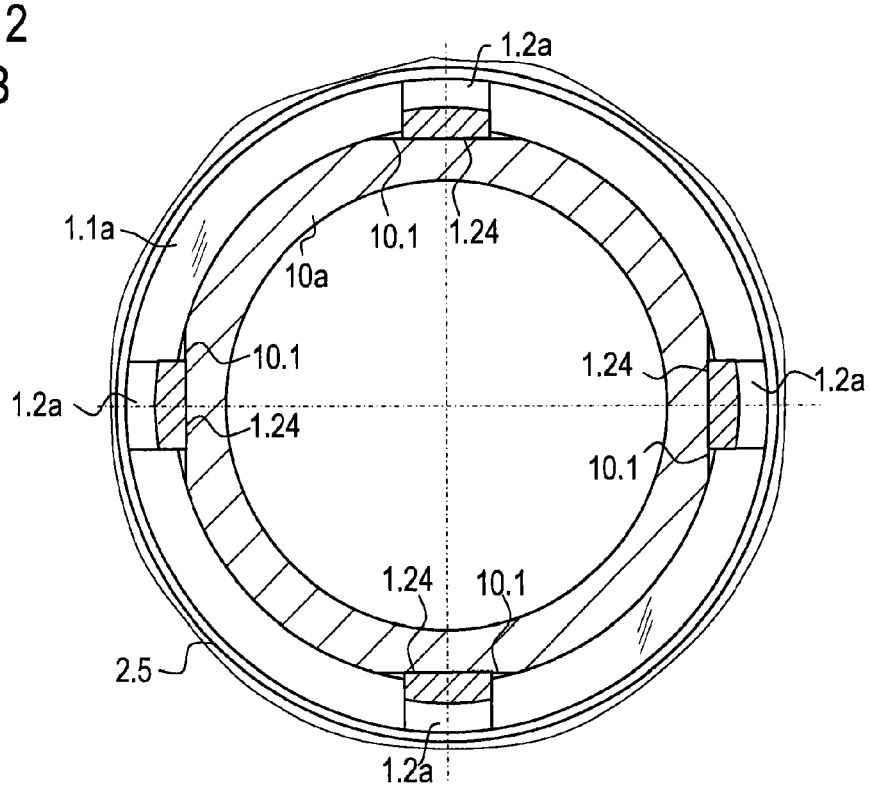
FIG. 2 is a partial cross-sectional view of the angle-measuring device illustrated in FIG. 1 taken along the line B-B.

Rotor 1 of the angle-measuring device includes a carrier element 1.1*a*, e.g., in the form of a hollow shaft whose hollow cylindrical inside space is provided for the torsionally fixed accommodation of a shaft 10*a* to be measured, so that shaft 10*a* is enclosed by carrier element 1.1*a* (see also FIG. 2). A graduation disk 1.11, on which an angle scaling is applied, is secured on rotor 1, i.e., on carrier element 1.1*a*, by a rigid adhesive connection. Graduation disk 1.11 is produced from a glass material, the angle scaling being disposed over the full perimeter in a ring shape on one end face of graduation disk 1.11. The angle scaling may be arranged as an incremental angle graduation and/or as an absolute angle coding. Incidentally, axis A also represents the geometrical axis of rotation of graduation disk 1.11. Moreover, an inner ring of a rolling-contact bearing 3 is attached to carrier element 1.1*a*, which is produced from steel. This inner ring encompasses a bearing surface for rolling elements, especially for balls. Present rolling-contact bearing 3 exhibits exceedingly high precision, especially with regard to its true running.

Figure 3:
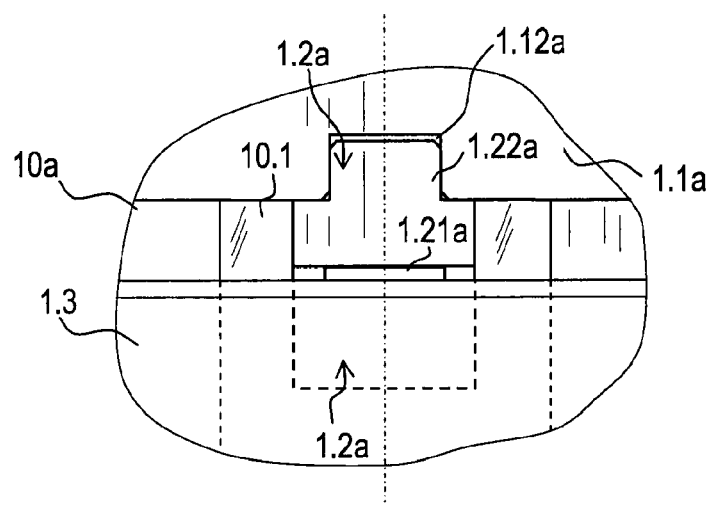
FIG. 3 is an enlarged detail view illustrating a connecting element of the angle-measuring device.

Furthermore, carrier element 1.1*a* includes a total of four recesses 1.12*a* distributed over the periphery with a 90° offset, one of recesses 1.12*a* also being shown in FIG. 3, for example. In each case, a projection 1.22*a* of a connecting element 1.2*a* projects into these recesses 1.12*a*. The width of projection 1.22*a*, as well as the width of recess 1.12*a*—in each case, in view of the circumferential direction—are dimensioned so that a transition fit or a clearance fit exists upon inserting projection 1.22*a* into recess 1.12*a*. In the lateral view, connecting element 1.2*a* has a z-shape, one limb of connecting element 1.2*a* having a taper 1.23, which in the exemplary embodiment illustrated, is geometrically a partial segment of the outside surface of a cone. Opposite this taper 1.23 radially on the inside, connecting element 1.2*a* has a flat surface 1.24. Also disposed on connecting element 1.2*a* is an elastic component 1.21*a* which, according to this exemplary embodiment, is in the form of a rubber element. According to FIG. 1, an annular flat end face 1.13 is produced at the axial end of carrier element 1.1*a* which is axially opposite recess 1.12*a*.

Figure 4:
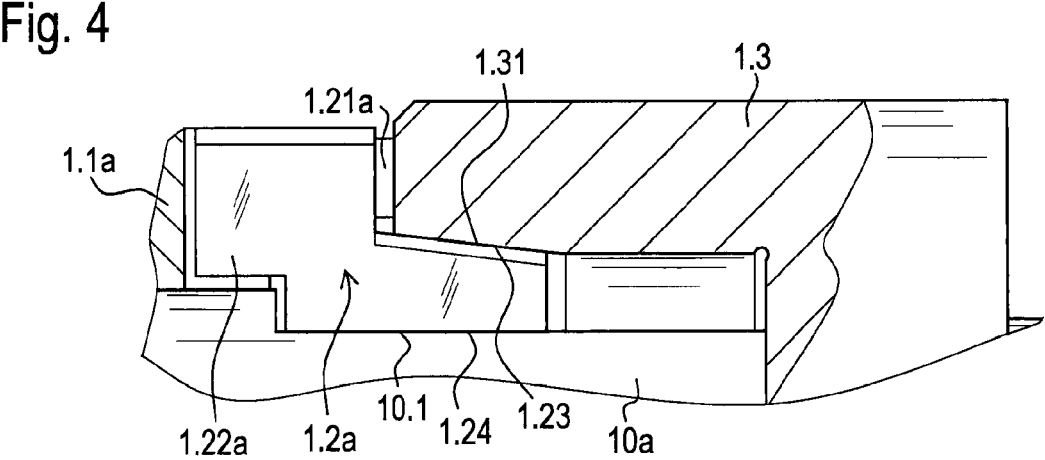
FIG. 4 is an enlarged detail view illustrating a connecting element of the angle-measuring device.

In addition, rotor 1 includes a device for affixing connecting element 1.2*a* relative to carrier element 1.1*a*, according to the exemplary embodiment, the affixing device is formed as a closed ring 1.3 having an internal thread. Furthermore, ring 1.3 has a conical surface 1.31 at its inner side (FIG. 4).

In contrast, stator 2 according to FIG. 1 includes a housing 2.4 which, for measuring operation, is rigidly fixed in position on a machine part, and is used to protect the interior of the angle-measuring device from environmental influences. In this connection, additionally a seal 2.5 is provided between carrier element 1.1a and housing 2.4. Located in housing 2.4 is what is referred to as a scanning unit, which includes an LED 2.2, a condenser lens 2.3 and a scanning board 2.1, a sensor element 2.11 having an integrated circuit being mounted on scanning board 2.1. Sensor element 2.11 having the integrated circuit is in the form of what is referred to as an opto-ASIC. LED 2.2, serving as light source, transmits light through condenser lens 2.3, and thereupon through graduation disk 1.11. LED 2.2, condenser lens 2.3 and sensor element 2.11 are assigned to stator 2, thus, to the second group of components of the angle-measuring device. On the other hand, as already mentioned, graduation disk 1.11 is secured on rotatable carrier element 1.1a. Graduation disk 1.11, which is thus situated between light source 2.2 and sensor element 2.11, is able, by its angle scaling, to modulate the irradiated light according to the angular position of carrier element 1.1a. The modulated light ultimately strikes photodetectors of sensor element 2.11. Due to this scanning, photoelectric signals are obtained which contain the information about the angular position of carrier element 1.1a, that is, of shaft 10a. The photoelectrically generated signals are processed by the integrated circuit of sensor element 2.11. The processed position signals are finally output via a cable to a further device, e.g., to a control device of a machine. Such an angle-measuring device operating according to an optical principle measures angular positions between carrier element 1.1a and stator 2 precisely to a few seconds of angle, or precisely to a few tenth-seconds of angle. Accordingly, it is important that the components of the scanning unit as well as graduation disk 1.11 be placed extremely precisely relative to each other, and that graduation disk 1.11 be rotationally mounted very exactly relative to the scanning unit.

A part of a torsionally rigid compensating coupling 2.6 is joined firmly to housing 2.4 by a screw connection. Furthermore, another part of compensating coupling 2.6 is fastened to the scanning unit. The outer ring of rolling-contact bearing 3 is likewise fastened to the scanning unit. In practice, shaft 10a to be measured and the machine part on which housing 2.4 is rigidly mounted, are not aligned exactly relative to each other. Using compensating coupling 2.6, shaft 10a to be measured may be mounted in a rigid and torsionally fixed manner on carrier element 1.1a of the angle-measuring device, while housing 2.4 may be attached firmly to the machine part. Unacceptably great stresses on rolling-contact bearing 3, for example, as the result of eccentricity or misalignments, may be avoided by axially and radially elastic compensating coupling 2.6.

In the course of mounting the angle-measuring device on shaft 10a, at the beginning, carrier element 1.1a is slid onto shaft 10a until end face 1.13 of carrier element 1.1a is received on a shoulder of shaft 10a. After that, connecting elements 1.2a are mounted by first, in each case, inserting a projection 1.22a of connecting element 1.2a into a recess 1.12a of carrier element 1.1a, while at the same time, flat surface 1.24 of connecting element 1.2a in question comes to rest on an axially parallel flattened region 10.1 of shaft 10a. Thus, flat surface 1.24 of connecting element 1.2a is then oriented parallel to axis A. Ring 1.3 is thereupon screwed onto shaft 10a. At the end of the screwing-on process, elastic component 1.21a is compressed and connecting elements 1.2a are shifted axially, after carrier element 1.1a has been pressed with its end face 1.13 against the corresponding shoulder of shaft 10a. As a result, upon further tightening of ring 1.3, in each case, inside conical surface 1.31 of ring 1.3 contacts taper 1.23 of connecting element 1.2a. Thus, due to ring 1.3, connecting element 1.2a is brought by axial displacement into a final positive-locking position, and is prestressed radially by a wedge effect against shaft 10a. The wedge effect results from the interaction of taper 1.23 with conical surface 1.31.

In addition, at end face 1.13, a frictionally engaged connection is produced with the shoulder of shaft 10a, the requisite frictional force being obtained from the coefficient of friction and the axial force as a result of the axial shift of ring 1.3. During normal operation, the torque necessary for the operation of the angle-measuring device, thus, for overcoming the braking torque, is transmitted due to this frictionally engaged connection. To produce complete security against slipping, in addition, an operative connection is produced, so that torque is transmittable with positive locking between connecting element 1.2a and carrier element 1.1a about axis A. This is achieved because projections 1.22a together with recesses 1.12a, in touch contact at axially parallel driver surfaces, interact with positive locking. Due to this construction, no radial forces are introduced into carrier element 1.1a bearing graduation 1.11, which contributes to the increase in precision of the angle-measuring device. As already mentioned above, during normal operation of the angle-measuring device, the rotary motion of carrier element 1.1a is initiated isogonally due to the frictionally engaged connection at its end face 1.13. The positive-locking operative connection only becomes active in case of an emergency to maintain the integrity. Accordingly, it may certainly have play within certain limits, depending upon how many angular seconds or angular minutes are tolerable from safety-related standpoints during emergency operation. On the other hand, the additional arrangement of a positive-locking operative connection, accompanied by simultaneous radial prestressing, does not impair the measuring accuracy of the angle-measuring device during normal operation.

This construction of the angle-measuring device is also characterized in that the area in which the radial prestressing is introduced between shaft 10a and connecting element 1.2a is axially offset with respect to rolling-contact bearing 3. Thus, flattened region 10.1 and flat surface 1.24 in particular are disposed with an axial offset with respect to the rolling-contact bearing. Finally, the location of the operative connection for the positive-locking transmission of the torque is also disposed with axial offset relative to the area in which the radial prestress is introduced between shaft 10a and connecting element 1.2a, i.e., is offset with respect to flattened region 10.1 and flat surface 1.24.

The following description of further exemplary embodiments is limited substantially to those circumstances which are modified compared to the other exemplary embodiments, especially compared to the first exemplary embodiment described above.

Figure 5:
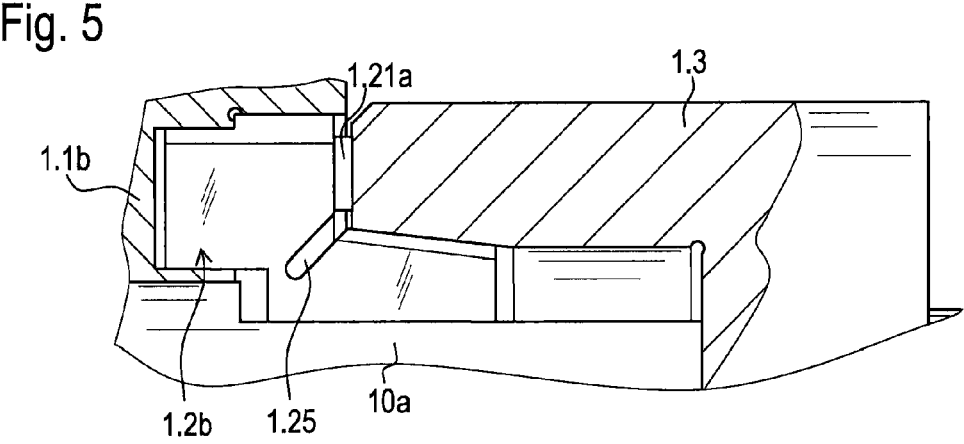
FIG. 5 is an enlarged detail view illustrating a connecting element of the angle-measuring device.

Compared to the first exemplary embodiment, the angle-measuring device according to a second exemplary embodiment (FIG. 5) has a modified carrier element 1.1b, as well as altered connecting elements 1.2b. The remaining components of the angle-measuring device may be viewed as identical to those of the first exemplary embodiment. To achieve increased elasticity, in particular, connecting element 1.2b has a gap 1.25 passing through in the tangential direction, so that a material thinning or a flexural hinge is obtained. Advantageously, gap 1.25 is oriented at a 45° angle with respect to axis A. In this context, carrier element 1.1*b* may be arranged such that it is used as guide for connecting element 1.2*b* in the area of the operative connection for the positive-locking transmission of the torque at radially set-apart surfaces. The necessary flexural softness may be achieved due to gap 1.25, so that connecting element 1.2*b* may be brought into a positive-locking position by axial shift of ring 1.3, while in addition, connecting element 1.2*b* is prestressed radially against shaft 10*a*.

Figure 6:
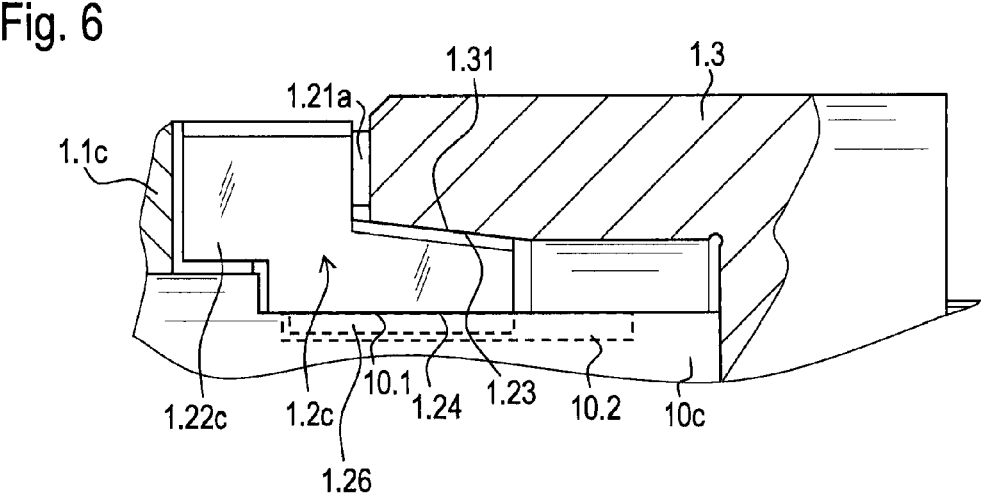
FIG. 6 is an enlarged detail view illustrating a connecting element of the angle-measuring device.

An arrangement according to a third exemplary embodiment is shown in FIG. 6. Here, the four connecting elements 1.2*c* are modified in a manner that they each have a rib 1.26 on their radially inside surfaces 1.24. This rib 1.26 is able to engage with a groove 10.2 of modified shaft 10*c*. Groove 10.2 and rib 1.26 are dimensioned such that they are able to be joined without play in the circumferential direction, while in the axial direction and the radial direction, in each case there is an air gap between the walls of groove 10.2 and rib 1.26. On one hand, assembly may be facilitated by the construction according to the third exemplary embodiment described here, since tilting of connecting elements 1.2*c* is avoided, especially when tightening ring 1.3. At the same time, the transmittable torque between shaft 10*c* and connecting elements 1.2*c* may be increased by groove 10.2 and rib 1.26.

Figure 7:
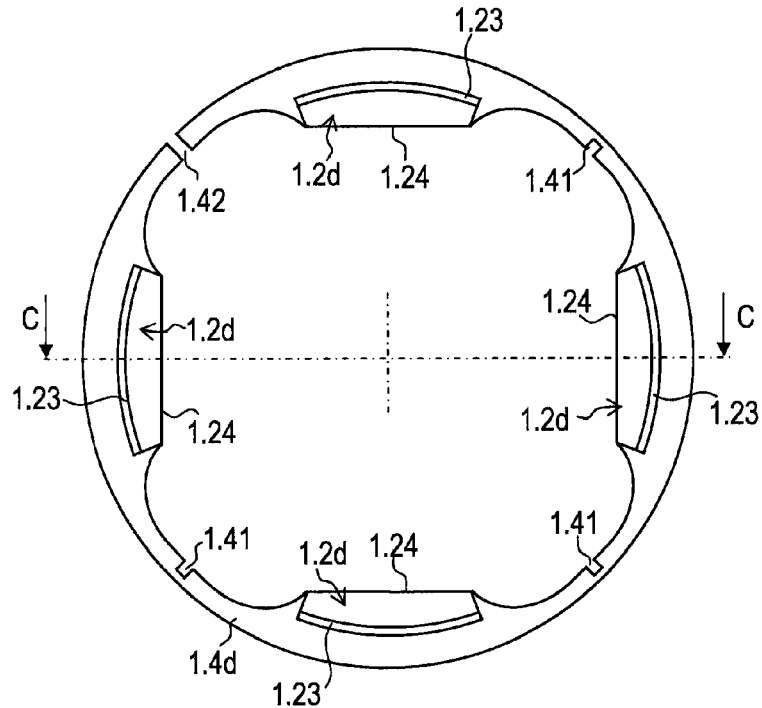
FIG. 7 is a top view of a plurality of connecting elements that are held together with a ring.
Figure 8:
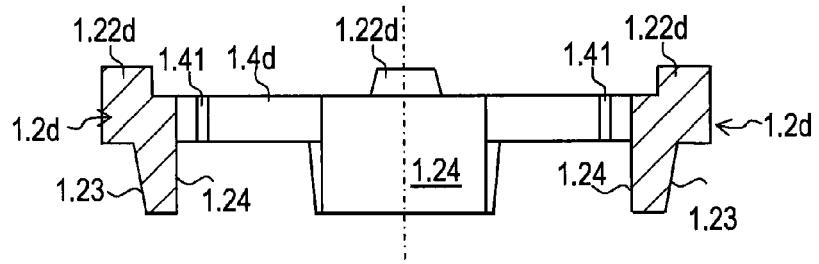
FIG. 8 is a cross-sectional view of the connecting elements with the ring.
Figure 9:
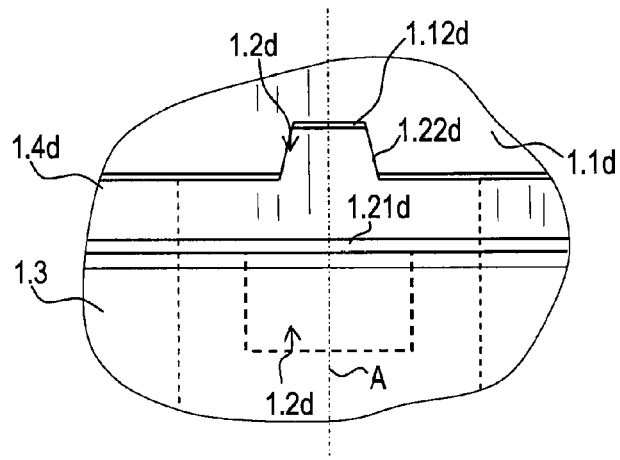
FIG. 9 is an enlarged detail view illustrating a connecting element of the angle-measuring device.

In a fourth exemplary embodiment according to FIGS. 7, 8 and 9, connecting elements 1.2*d* are joined to each other by an annular member 1.4*d*. Annular member 1.4*d* has recesses 1.41 as well as a slit 1.42. Annular member 1.4*d* may be elastically expanded for assembly due to recesses 1.41 and slit 1.42. As a variation of the exemplary embodiments, here, connecting elements 1.2*d* have conical projections 1.22*d*. As shown in FIG. 9, in the present case, conical projections 1.22*d* are in each instance pressed into a conical recess 1.12*d* of carrier element 1.1*d* by manipulation of ring 1.3 via a circumferential elastic component 1.21*d*. In this manner, a zero-play connection may be produced in the circumferential direction between connecting elements 1.2*d* and carrier element 1.1*d*, so that torque is transmittable with positive locking between connecting element 1.2*d* and carrier element 1.1*d* about axis A. In this exemplary embodiment, as well, connecting elements 1.2*d* and carrier element 1.1*d* have driver surfaces contacting each other, whose respective normal vector has a tangential directional component specific to the axis, even though here, the driver surfaces are inclined at an angle relative to the axis.

Figure 10:
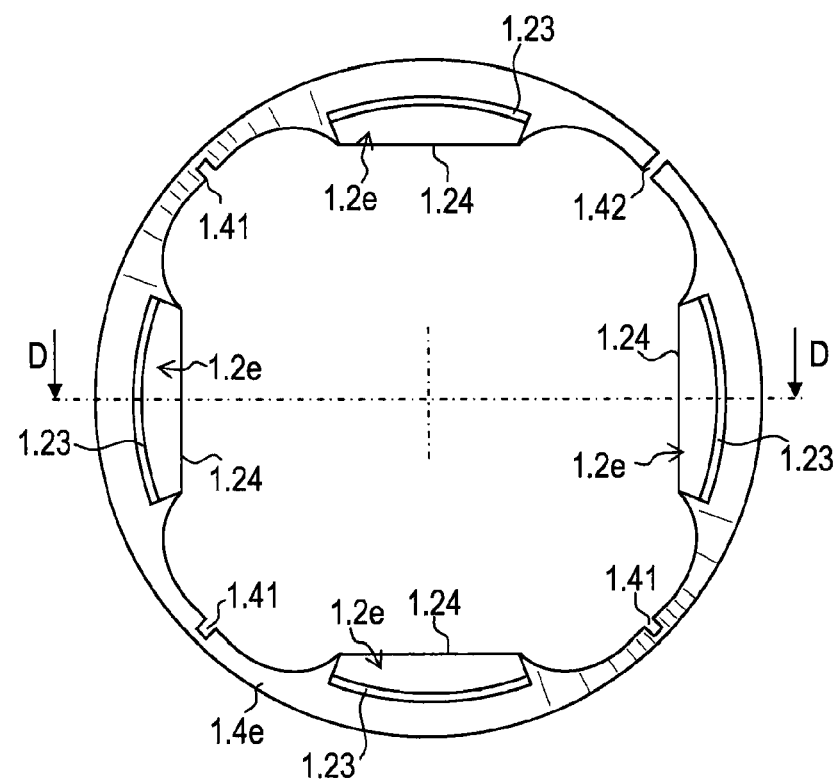
FIG. 10 is a top view of a plurality of connecting elements that are held together with a ring.
Figure 11:
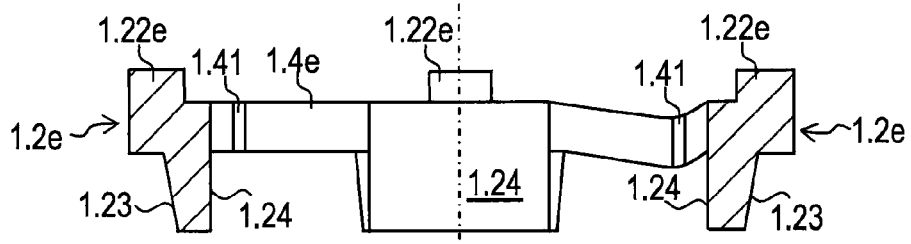
FIG. 11 is cross-sectional view of the connecting elements with the ring.
Figure 12:
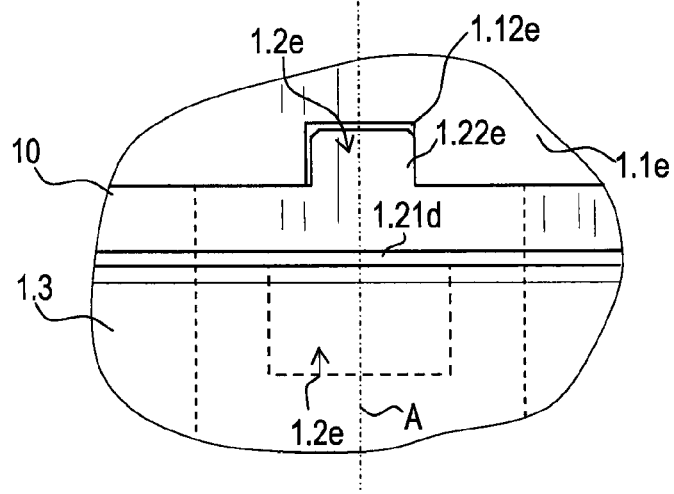
FIG. 12 is an enlarged detail view illustrating a connecting element of the angle-measuring device.

FIGS. 10 to 12 illustrate a type of construction according to a fifth exemplary embodiment. Connecting elements 1.2*e* are interconnected by an annual member 1.4*e* here, as well. Here, however, annular member 1.4*e* has a cambered shape in two areas between two connecting elements 1.2*e*, so that annular member 1.4*e* thus has axial bulges. Furthermore, connecting elements 1.2*e* have projections 1.22*e* which have an undersize in the circumferential direction compared to recesses 1.12*e* of carrier element 1.1*e*. A circumferential elastic component 1.21*d* is disposed on annular member 1.4*e* here, as well; because of the axial elasticity of annular member 1.4*e* given suitable construction, it is also possible to dispense with the elastic component. If ring 1.3 is shifted in the axial direction by rotating it, the two bulges are forced into one plane, which is oriented orthogonally with respect to axis A. Thus, a tangential movement of connecting elements 1.2*e* adjacent to the bulges takes place, and projections 1.22*e* are shifted in the circumferential direction accordingly. Carrier element 1.1*e* and connecting elements 1.2*e*, especially projections 1.22*e*, are dimensioned such that in the assembled state, projections 1.22*e* are pressed against the walls or driver surfaces of associated recesses 1.12*e*. In this manner, a positive-locking connection is produced in the circumferential direction, so that torque is transmittable about axis A between connecting elements 1.2*e* and carrier element 1.1*e* in a manner that is non-slip and without play for both directions of rotation.

The individual modified components of the various exemplary embodiments are combinable and exchangeable. Thus, for example, a connecting element 1.2*a*, 1.2*b*, 1.2*c* according to the first three exemplary embodiments may have a conical projection 1.22*d* and interact with a correspondingly adapted carrier element 1.1*a*, 1.1*b*, 1.1*c*.

What is claimed is:

1. An angle-measuring device, comprising:
   a first group of components including: a hollow shaft adapted to enclose a shaft; a graduation disk secured to the hollow shaft; a connecting element; and a device adapted to affix the connecting element relative to the hollow shaft; and
   a second group of components including a sensor element adapted to scan the graduation disk;
   wherein the groups of components are rotatable relative to each other about an axis and a relative angular position between the groups of components is determinable by the angle-measuring device;
   wherein the hollow shaft and the connecting element are arranged such that the connecting element is operatively connectable with the hollow shaft in a manner that torque is transmittable with positive locking between the connecting element and the hollow shaft about the axis; and
   wherein the connecting element is movable into a positive-locking position by axial displacement by the device adapted to affixing the connecting element and is radially prestressable against the shaft.

2. The angle-measuring device according to claim 1, wherein the radial prestress is produceable by a wedge effect.

3. The angle-measuring device according to claim 2, wherein at least one of (a) the device adapted to affixing the connecting element and (b) the connecting element includes tapers to attain the wedge effect.

4. The angle-measuring device according to claim 1, wherein the device adapted to affix the connecting element is arranged as a closed ring.

5. The angle-measuring device according to claim 4, wherein the device adapted to affix the connecting element includes an internal thread.

6. The angle-measuring device according to claim 1, further comprising an elastic component arranged between the connecting element and the device adapted to affix the connecting element.

7. The angle-measuring device according to claim 1, wherein the connecting element engages at one axial end of the hollow shaft, and at the other axial end of the hollow shaft, a surface provided which is movable into frictional operative connection with the shaft.

8. The angle-measuring device according to claim 1, wherein the device adapted to affix the connecting element is manipulable from the axial direction.

9. The angle-measuring device according to claim 1, wherein the connecting element includes a flat surface on a side facing the axis during proper use.

10. The angle-measuring device according to claim 1, wherein the connecting element includes a projection on a side facing the axis during proper use.

11. The angle-measuring device according to claim 1, further comprising a plurality of connecting elements joined to each other.

12. The angle-measuring device according to claim 11, wherein the connecting elements are joined to each other by an axially elastic member.

* * * * *